United States Patent [19]

Ono et al.

[11] Patent Number: 4,891,471
[45] Date of Patent: Jan. 2, 1990

[54] WIRING HARNESS PROTECTOR

[75] Inventors: Mamoru Ono; Norihiro Yoneyama; Toshio Okazaki, all of Toyota, Japan

[73] Assignee: Yazaki Corporation, Tokyo, Japan

[21] Appl. No.: 207,966

[22] Filed: Jun. 17, 1988

[30] Foreign Application Priority Data

Jul. 2, 1987 [JP] Japan ................................ 62-100917

[51] Int. Cl.$^4$ .............................................. H02G 3/04
[52] U.S. Cl. .................................. 174/68.3; 138/166; 174/101; 220/339
[58] Field of Search .................. 174/68.3, 71 R, 72 A, 174/72 C, 92, 101; 138/162, 166; 220/339, DIG. 13; 206/1.5

[56] References Cited

U.S. PATENT DOCUMENTS 4,184,594 1/1980 Hehn ............................... 220/339 X Primary Examiner—Laramie E. Askin
Attorney, Agent, or Firm—Robbins & Laramie

[57] ABSTRACT

Disclosed is a strands protector which comprises a U-shaped housing having a three-dimensionally bent bottom wall and side walls upstanding from the bottom wall, and a cover member connected by a hinge to the housing to close the opening of the housing and releasably secured to the housing by locking means. The cover member includes a hinge at a position corresponding to the location of the bent portion of the bottom wall of the housing.

Also disclosed is a locking mechanism which comprises a locking arm provided on one of two hinge-connected members and an arm-engaging receptacle provided on the other member. The locking arm has an end projection adapted to be inserted in a central hole of the receptacle to secure the two members together, and the receptacle has a projection insertion cutout at a position where interference occurs between the projection of the locking arm and the receptacle when one of these two members is superposed on the other.

7 Claims, 5 Drawing Sheets

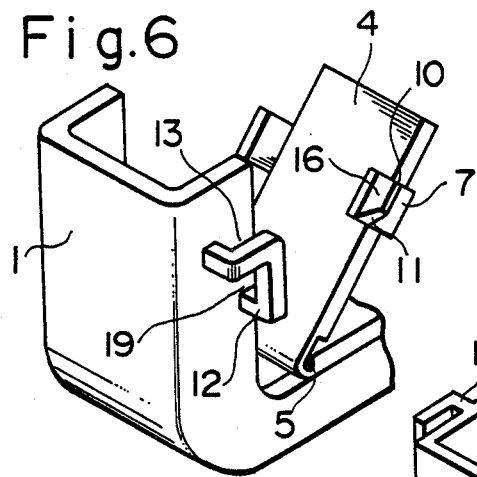
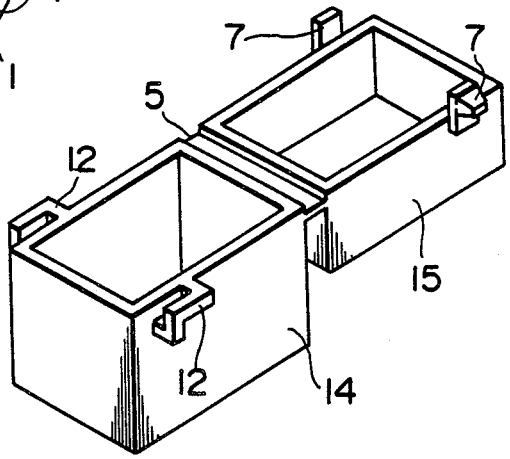
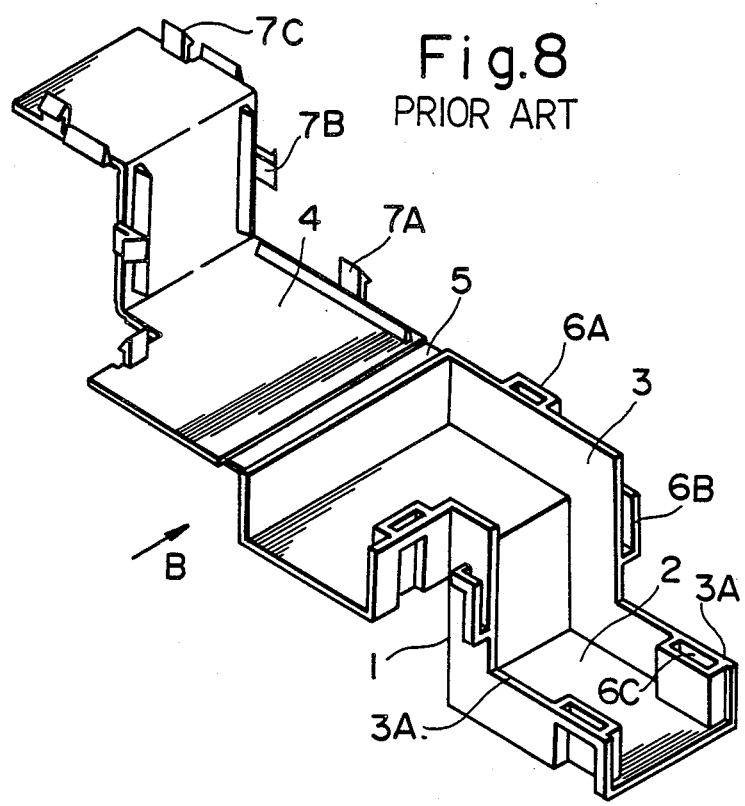
Fig.8 PRIOR ART

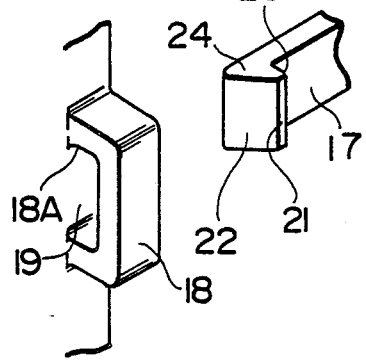
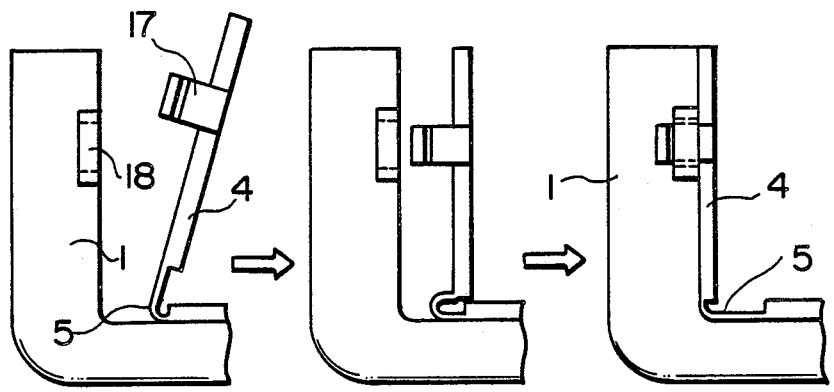

WIRING HARNESS PROTECTOR

BACKGROUND OF THE INVENTION

1. Field of the Invention

This invention relates to improvements in the structure of a protector used for protecting a bundle of many strands such as electric wires, wire harnesses or optical fiber cables. This invention relates also to improvements in the structure of a locking mechanism provide on two hinge-connected members such as those of a strands protector so as to secure the two members in an assembled state when one of the two members is superposed on the mating member by rotating the fomer relative to the latter around the hinge.

2. Description of the Prior Art

A variety of kinds of electric equipment are now incorporated in an automobile, and an enormous number of strands such as electric wires are used for establishing wiring connections required for such electric equipment. The electric wires are suitably bundled and housed in a protector so that they can be regularly arranged without being entangled and, after the step of wiring, they can be protected against damage which leads to disabling the associated electric equipment. Such a protector is frequently shaped into a three-dimensionally bent configuration depending on the location or environment where it is installed.

A prior art protector of the kind described above is commonly composed of a housing in the form of a U-shaped channel member for receiving strands therein and a cover member covering the opening of the housing. The cover member is connected by a hinge to the housing, and the housing and the cover member are assembled and secured together by engagement of a plurality of female and male locking means. When such a protector has a three-dimensionally bent configuration, the female locking means must be sized to be larger than the male locking means, because the cover member is superposed on the housing by rotating it around the hinge. Therefore, the prior art protector has been defective in that play is inevitably formed between the female and male locking means after the cover member is assembled with the housing, and the holding strength of the locking mechanism decreases with the result that the cover member tends to be disengaged from the housing.

The housing and the cover member constituting the protector of this kind are integrally formed by molding a synthetic resin in a metal mold. However, due to the three-dimentional configuration of the protector, a metal mold having a correspondingly larger size has been required, and the metal mold had to be opened by a distance two times as large as the height of the housing for the withdrawal of the molded protector from the mold.

The locking mechanism provided on the protector having such a three-dimensionally bent configuration will now be described. As the male locking means, a plurality of locking arms each having a projection at its free end are erected on the cover member, and, as the female locking means, a plurality of arch-shaped arm-engaging receptacles are provided on the housing at positions corresponding to the locking arms respectively. In the prior art protector having such locking arms and arm-engaging receptacles, the projection of each locking arm must be rectilinearly inserted into the central hole of the corresponding arm-engaging receptacle, and the positioning of the cover member connected to the housing by the hinge of small thickness is difficult, resulting in low efficiency of positioning the cover member relative to the housing. Further, because an extra load may be imparted to the hinge having a low mechanical strength, the hinge may not be able to withstand such an extra load.

SUMMARY OF THE INVENTION

With a view to obviate the prior art defects pointed out above, it is an object of the present invention to provide an improved strands protector in which the play between the female and male locking means is decreased to increase the holding strength of the housing holding the cover member, which requires a smaller metal mold for molding the same, and which decreases the amount of required stroke for opening the metal mold after the molding operation.

In accordance with one aspect of the present invention which attains the above object, there is provided a strands protector comprising a U-shaped housing having a bottom wall including a three-dimensional bend therein and side walls upstanding from the longitudinal sides of the bottom wall, and a cover member connected by a hinge to the side walls of the housing to close the opening of the housing and releasably secured to the side walls by locking means, the cover member including a hinge disposed at a position corresponding to the location of the bend in the bottom wall of the housing.

Another object of the present invention is to provide a locking mechanism for use in a strands protector of a type including a housing and a cover member connected by a hinge to the housing, so that the housing and the cover member can be easily assembled and secured together by merely rotating the cover member relative to the housing around the hinge.

In accordance with another aspect of the present invention which attains the above object, there is provided a locking mechanism comprising a locking arm provided on one of two hinge-connected two members adapted to be assembled together by rotating that member around the hinge to superpose that member on the other member, and an arm-engaging receptacle provided on the other member to receive an end projection of the locking arm in its central hole thereby securing the two members together, the arm-engaging receptacle including a projection insertion cutout at a position where interference occurs between the projection of the locking arm and the arm-engaging receptacle when one of the two members is superposed on the other.

According to the latter aspect of the present invention, the projection of the locking arm provided on one of the members does not collide against the side wall of the arm-engaging receptacle provided on the other member during rotation of the former member around the hinge to be superposed on the latter member, because the projection insertion cutout is provided on the arm-engaging receptacle at the position where the movement of the projection of the locking arm is interfered by the arm-engaging receptacle.

Further, because this cutout acts also as a guide during insertion of the projection of the locking arm into the central hole of the arm-engaging receptacle, the engagement can be very smoothly attained, and the member rotated around the hinge of short length can be easily assembled with the mating member without swinging or oscillation.

BRIEF DESCRIPTION OF THE DRAWINGS

FIG. 6 enlarged perspective view of part of the protector housing and part of the cover member.

FIG. 7 perspective view of another embodiment of the present invention.

FIG. 8 is a perspective view of a prior art strands protector.

FIG. 11 is an enlarged perspective view of part of the housing of the prior art protector and part of the cover member.

FIG. 12 is an enlarged perspective view of the projection of the locking arm and the arm-engaging receptacle in the prior art protector.

FIG. 13 is a view showing the steps (A), (B) and (C) of assembling the cover member with the housing of the prior art protector.

DESCRIPTION OF THE PREFERRED EMBODIMENTS

An example of prior art protectors of three-dimensionally bent type for receiving and protecting strands such as electric wires will be briefly described before describing the present invention in detail.

Figure 9:
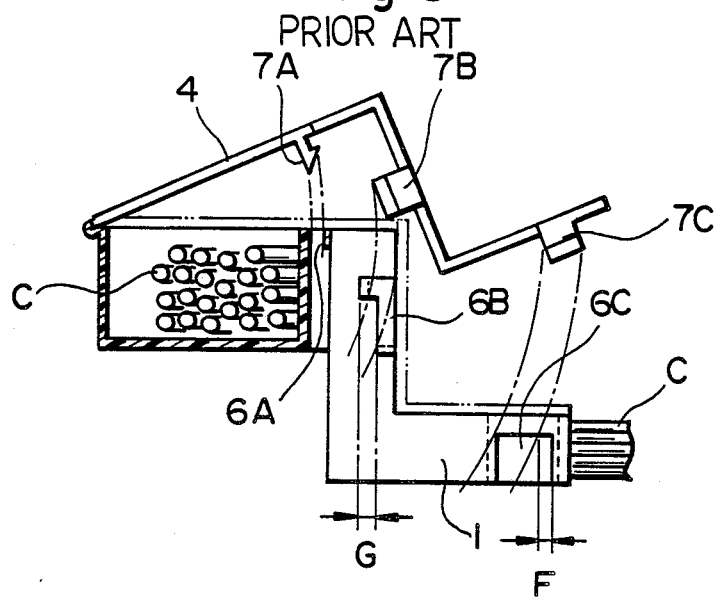
FIG. 9 is a side elevational view, partially in section, showing the manner of securing the cover member to the housing of the prior art protector.

FIG. 8 shows the structure of such a prior art strands protector. Referring to FIG. 8, the prior art protector includes a U-shaped housing 1 having a bottom wall 2 and side walls 3 upstanding from the longitudinal sides of the bottom wall 2, a cover member 4, a hinge 5 connecting to the cover member 4 to the housing 1, a plurality of female locking means or arm-engaging receptacles 6A, 6B and 6C, and a plurality of male locking means or locking arms 7A, 7B and 7C. The cover member 4 is locked or secured to the housing 1 by engagement of the locking arms 7A, 7B, 7C with the corresponding arm-engaging receptacles 6A, 6B, 6C respectively. In the protector structure shown in FIG. 8, the cover member 4 has a three-dimensional shape which conforms to the planes formed by the stepped upper ends 3A of the two side walls 3 of the housing 1. After inserting a bundle of strands C in the housing 1 of the protector, the cover member 4 is rotated around the hinge 5 to be secured to the housing 1 as shown in FIG. 9. In this case, the locking arms 7A, 7B and 7C are engaged by the arm-engaging receptacles 6A, 6B and 6C respectively. The two-dot chain lines in FIG. 9 show the state of the cover member 4 secured to the housing 1.

However, in the prior art protector, the cover member 4 is rotated around the hinge 5 along a locus as shown by the one-dot chain lines in FIG. 9 before it is secured to the housing 1. Therefore, the arm-engaging receptacle 6C engaging the associated locking arm 7C must be sized to be larger by a dimension F than the locking arm 7C, and the arm-engaging receptacle 6B engaging the associated locking arm 7B must also be sized to be larger by a dimension G than the locking arm 7B. The result is that these increased dimensions F and G produce play at these portions. Thus, the prior art protector has been defective in that the holding strength of the locking mechanism holding the cover member 4 secured to the housing 1 decreases, and the cover member 4 tends to b disengaged from the housing 1.

Figure 10:
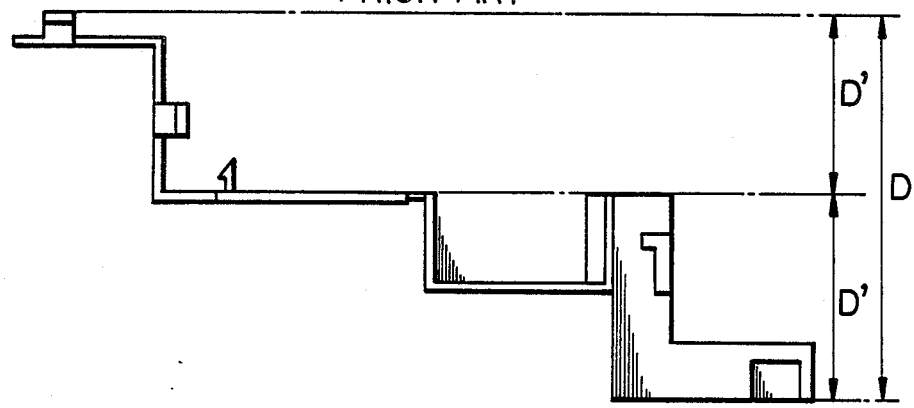
FIG. 10 is a side elevational view of the prior art protector when viewed in the direction of the arrow B in FIG. 8.

The housing 1 and the cover member 4 constituting the protector are integrally formed by molding a synthetic resin in a metal mold. However, due to the three-dimensional configuration of the protector, a metal mold having a correspondingly larger size has been required, and the metal mold had to be opened by a distance D two times as large as the height D' of the housing 1 as shown in FIG. 10.

Figure 1:
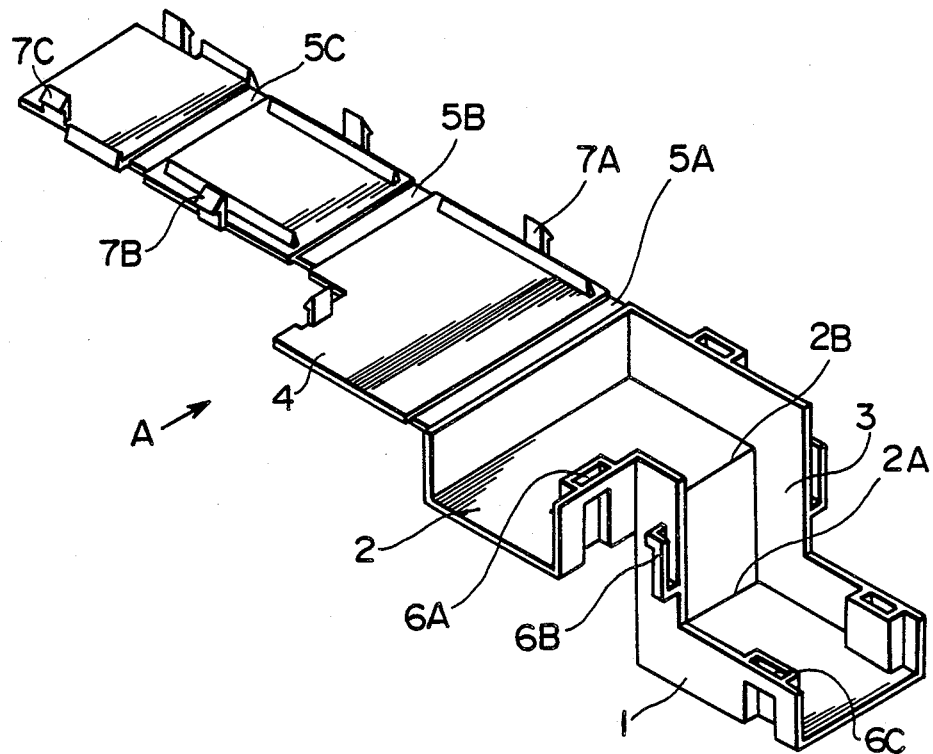
FIG. 1 is a perspective view of an embodiment of the strands protector according to the present invention.
Figure 2:
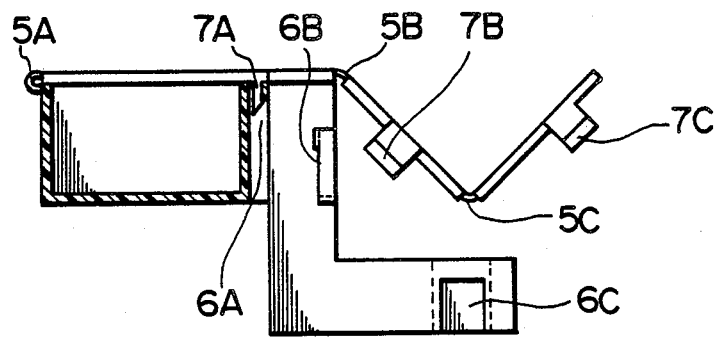
FIG. 2 is a side elevational view, partially in section, showing the manner of securing the member to the protector housing.
Figure 3:
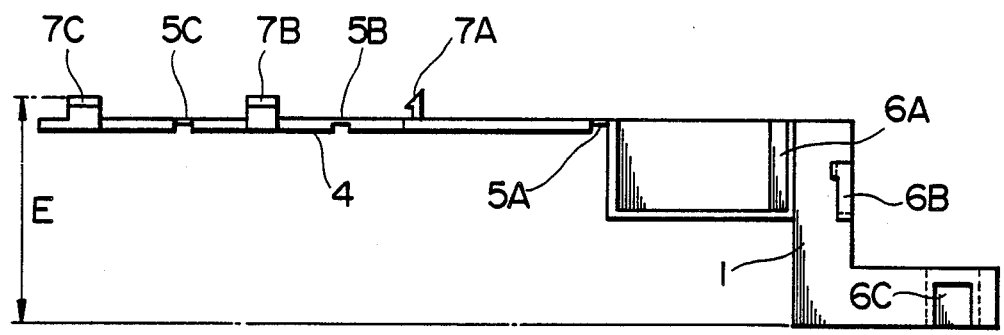
FIG. 3 is a elevational view of the protector when viewed in the direction of the arrow A in FIG. 1.

An embodiment of the protector according to the present invention which solves such prior art problems will now be described with reference to FIGS. 1, 2 and 3. In FIGS. 1 to 3, like reference numerals are used to designate like parts appearing in FIGS. 8 and 9.

Referring to FIGS. 1 to 3, the protector comprises a U-shaped housing 1 having a bottom wall 2 including three-dimensional bends 2A and 2B and side walls 3 upstanding from the longitudinal sides of the bottom wall 2. A cover member 4 is connected by a hinge 5A to the housing 1 to be superposed on the side walls 3 of the housing 1 so that the cover member 4 can be integrally assembled with the housing 1. The cover member 4 includes hinges 5B and 5C at positions corresponding to the respective bends 2A and 2B provided in the bottom wall 2 of the housing 1 so that the cover member 4 can be bent along the upper ends of the side walls 3 of the housing 1. A plurality of female locking means or arm-engaging receptacles 6A, 6B and 6C are provided on the side walls 3 of the housing 1, and a plurality of mating male locking means or locking arms 7A, 7B and 7C are provided on the cover member 4 to engage the arm-engaging receptacles 6A, 6B and 6C respectively.

FIG. 2 shows the manner of engagement between the locking arms 7A, 7B, 7C and the arm-engaging receptacles 6A, 6B, 6C. First, the locking arms 7A are rotated around the hinge 5A to be engaged by the associated arm-engaging receptacles 6A. Then, the locking arms 7B are rotated around the hinge 5B to be engaged by the associated arm-engaging receptacles 6B. Finally, the locking arms 7C ar rotated around the hinge 5C to be engaged by the associated arm-engaging receptacles 6C, thereby securing the cover member 4 to the housing 1. It will be seen in FIG. 2 that the centers of rotation of the locking arms 7B and 7C are shifted to the hinges 5B and 5C respectively, that is, the radiuses of rotation of these locking arms 7B and 7C are small. Therefore, the undesirable play inevitably formed due to engagement of the locking arms 7B and 7C with the respective arm-engaging receptacles 6B and 6C can be reduced to increase the strength holding the cover member 4 secured to the housing 1. Thus, the cover member 4 is not easily disengaged from the housing 1.

FIG. 3 is a side elevation view of the protector when viewed in the direction of the arrow A in FIG. 1. It will be seen in FIG. 3 that the cover member 4 is planar in side elevation. Therefore, as indicated by E in FIG. 3, the dimensional requirement for opening a metal mold after molding the protector is reduced to about ½ of the prior art dimensional requirement D shown in FIG. 10, and the size of the mold can also be decreased.

According to the present invention, hinges are provided in the cover member at positions corresponding to the three-dimensional bends provided in the bottom wall of the housing of the strands protector. Therefore, the undesirable play in the locking mechanism can be reduced to increase the strength connecting the cover member with the housing so that the cover member is not easily disengaged from the housing. Further, because of the reduced dimensional requirement for opening the mold after molding the protector, the protector can be molded by a small-sized molding apparatus, and the size of the mold can also be decreased.

FIGS. 11 and 12 show the structure of a prior art locking mechanism used for securing a protector housing 1 and a cover member 4 together.

Referring to FIGS. 11 and 12, a locking arm 17 of cantilever type extends from each of the longitudinal sides of the cover member 4 toward the protector housing 1. The locking arm 17 is flexible and has a projection 21 on the outer face of its free end. As seen in FIG. 12, the projection 21 has a taper portion 22 tapering rearward from the free end of the locking arm 17, and a flat portion 23 substantially perpendicular to the outer face of the locking arm 17 is formed at the rear side of the free end of the locking arm 17.

On the other hand, an arch-shaped arm-engaging receptacle 18 is provided on each of the outer side faces of the protector housing 1 at a position corresponding to the mating locking arm 17, and a central hole 19 for insertion of the projection 21 of the locking arm 17 is provided in the arm-engaging receptacle 18.

After strands are placed in the protector housing 1, the cover member 4 is rotated around a hinge 5 of small thickness as shown in FIG. 13 until the cover member 4 is brought to a state substantially parallel to the protector housing 1 as shown in FIG. 13. Then, while maintaining the cover member 4 in the state substantially parallel to the protector housing 1, the cover member 4 is superposed on the protector housing 1, and, at the same time, the projection 21 of each of the locking arms 17 is inserted into the central hole 19 of the associated arm-engaging receptacle 18 to secure the cover member 4 to the protector housing 1, as shown in FIG. 13.

In the manner discribed above, the cover member 4 is superposed on the protector housing 1 in the relation maintained parallel to the protector housing 1. This is because the projection 21 of the locking arm 17 must be rectilinearly inserted into the central hole 19 of the arm-engaging receptacle 18 so that the side faces 24 of the projection 21 of the locking arm 17 shown in FIG. 12 may not interfere with the inner side faces 18A of the arm-engaging receptacle 18 during insertion.

Therefore, the operation for assembling the cover member 4 with the protector housing 1 must be carried out according to the troublesome procedure shown in FIGS. 13 to 13. Further, the positioning of the cover member 4 supported by the hinge 5 having the small thickness and large length is difficult to properly attain, resulting in low efficiency of the assembling operation. In addition, due to impartation of an extra load to the hinge 5 having a low mechanical strength, the hinge 5 may not be able to withstand such an extra load.

With a view to solve such a prior art problem, the present invention provides an improved locking mechanism.

Figure 5:
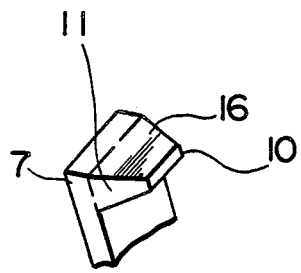
FIG. 5 enlarged perspective view of the projection of the locking arm.

Referring to FIG. 6, a cover member 4 is rotated around a hinge 5 to be superposed on a protector housing 1. A locking arm 7 is erected on each of the longitudinal sides of the cover member 4, and a projection 10 having a taper portion 16 and a flat portion on both faces respectively of the free end of the locking arm 7 is provided. The above arrangement is similar to that of the prior art locking mechanism. The present invention differs from the prior art structure in that a taper portion 11 tapering from the locking arm 7 toward the top of the projection 10 is provided on one of the side faces of the projection 10 on the side nearer to the hinge 5, as best shown in FIG. 5.

On the other hand, an arch-shaped arm-engaging receptacle 12 is provided on each of the outer side faces of the protector housing 1 at a position corresponding to the mating locking arm 7, and a central hole 19 for insertion of the projection 10 of the locking arm 7 is provided in the arm-engaging receptacle 12. The arm-engaging receptacle 12 is formed with a cutout 13 at a portion where the movement of the projection 10 of the locking arm 7 rotating with the rotation of the cover member 4 around the hinge 5 is interfered by the arm-engaging receptacle 12.

The upper arm 12A of the arm-engaging receptacle 12 is displaced away from the projection 10 of the locking arm 7 to avoid interference with the projection 10. The projection 10 of the locking arm 7 moving toward the arm-engaging receptacle 12 is advanced through the cutout 13 of the arm-engaging receptacle 12 until its taper portion 11 abuts the arm-engaging receptacle 12. Due to slight elastic deformation of the arm-engaging receptacle 12, the projection 10 of the locking arm 7 is inserted into the central hole 19 of the arm-engaging receptacle 12 by being guided by the receptacle 12, and the opposite face 10A of the taper portion 11 abuts the arm-engaging receptacle 12 to lock the cover member 4 to the protector housing 1.

Figure 4:
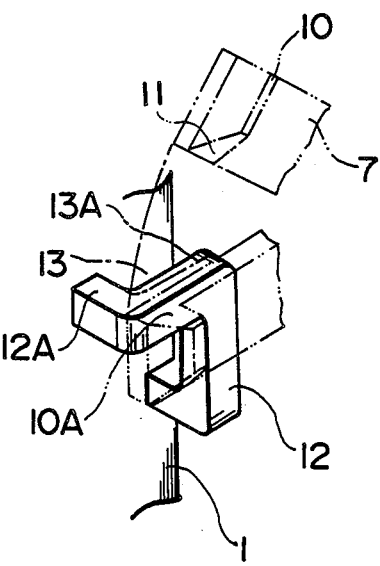
FIG. 4 is an enlarged perspective view of the projection of the locking arm and the associated arm-engaging receptacle.

In the embodiment of the locking mechanism of the present invention, the taper portion 11 is provided on the projection 10 of the locking arm 7. However, the arm-engaging receptacle 12 may be provided with a taper portion 13A for guiding insertion of the projection 10 of the locking arm 7, as shown in FIG. 4.

Thus, the cover member 4 is assembled with and locked to the protector housing 1 by merely rotating the cover member 4 around the hinge 5. Therefore, the hinge 5 of small thickness need not have a considerable length, unlike that of the prior art one, and the cover member 4 can be more easily assembled with the protector housing 1 by merely rotating it around the hinge 5.

The locking mechanism described above is widely applicable to locking of hinge-connected members superposed by rotation of one of the members relative to the other around the hinge. Thus, the present invention further includes a modification where one of two members is connected integrally to the mating member through a hinge. FIG. 7 shows such a modification. Referring to FIG. 7, a lower casing 14 and an upper casing 15 are integrally connected by a hinge 5, and a plurality of locking arms 7 and a plurality of arm-engaging receptacles 12 are provided on the upper and lower casings 15 and 14, respectively, so that the upper casing 15 can be locked to the lower casing 14 by engagement of the locking arms 7 with the respective arm-engaging receptacles 12.

Thus, the locking mechanism of the present invention using a plurality of locking arms for locking one of two hinge-connected members to the other comprises a plurality of arm-engaging receptacles each having a cutout for guiding a projection provided on the corresponding locking arm, so that the troublesome assembling can be very easily attained.

Further, the hinge connecting the two members has a small thickness and a short length, so that relative oscillation of these two members can be decreased, rattling of the locking mechanism can be prevented, and the useful service life of the hinge can be extended. The cost of the locking mechanism of the present invention having such advantages is almost equal to that of prior art ones.

What is claimed is:

1. A wiring harness protector comprising: a U-shaped housing having a bottom wall including three-dimensional bends therein and a pair of side walls upstanding from the longitudinal sides of said bottom wall, and a cover member connected to a portion of said side walls by a hinge so as to close the opening of said housing and being releasably secured to said side walls by locking means which engages said cover member with said side walls under a snapping action, wherein said cover member includes hinges at positions corresponding to the locations of the bends of said bottom wall.

2. A wiring harness protector according to claim 1, wherein said locking means comprises a locking arm having a projection provided on said cover member and an arm-engaging receptacle on a side wall at a position corresponding to said locking arm, said arm-engaging receptacle including a projection insertion cutout at a position where interference occurs between said projection of said locking arm and said arm-engaging receptacle when said cover member is superposed on said side walls in a closed position.

3. A wiring harness protector according to claim 2, wherein said projection of said locking arm has a slanted surface which faces to an adjacent hinge of said cover member and is slanted toward the top thereof.

4. A wiring harness protector according to claim 2, wherein a portion of said arm-engaging receptacle receiving said projection of said locking arm is provided with a rounded edge.

5. A wiring harness protector according to claim 2, wherein the projection insertion cutout of said arm-engaging receptacle is located at the end of said receptacle which the projection encounters first during insertion into the arm-engaging receptacle.

6. A wiring harness protector according to claim 1, wherein said hinge which connects said cover member to a portion of said side walls is connected integrally with the free end of one of said side walls.

7. A wiring harness protector according to claim 1, wherein said housing and said cover member are integrally formed of a molded plastic material.

* * * * *